June 11, 1929. R. J. STEPICH 1,716,712
WASHING MACHINE FOR VEGETABLES, FRUIT, AND THE LIKE
Filed Feb. 27, 1928   2 Sheets-Sheet 2
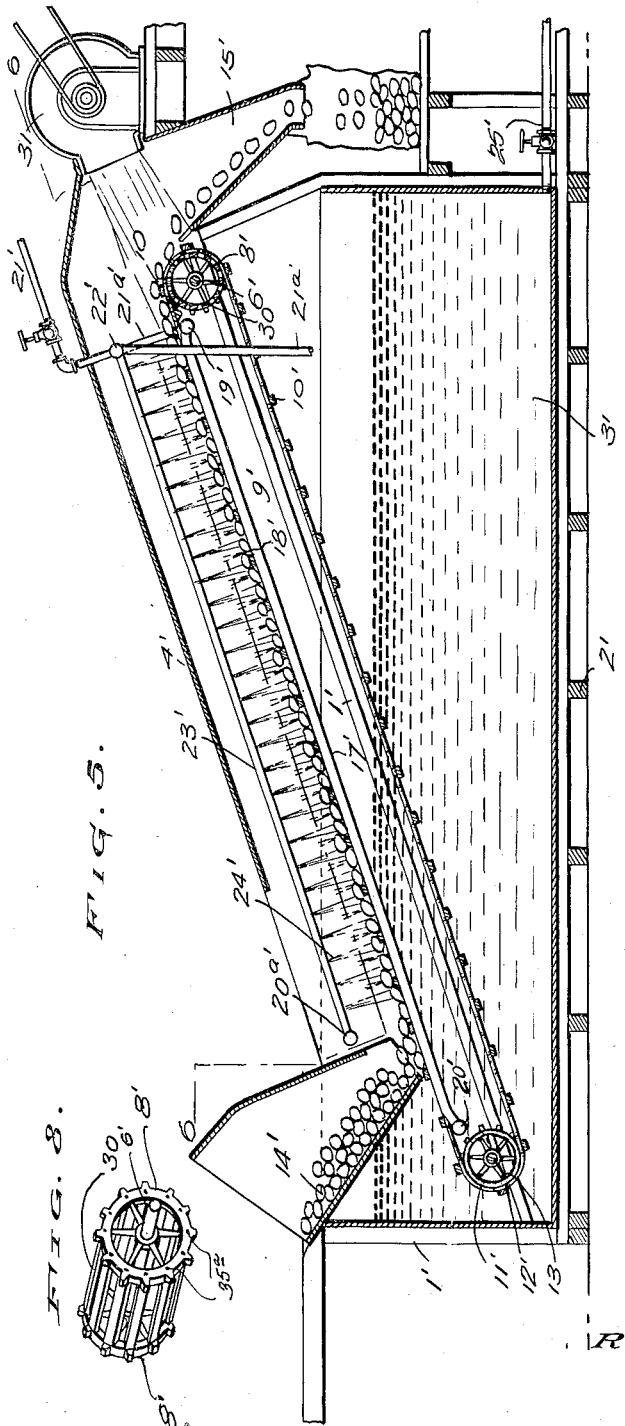
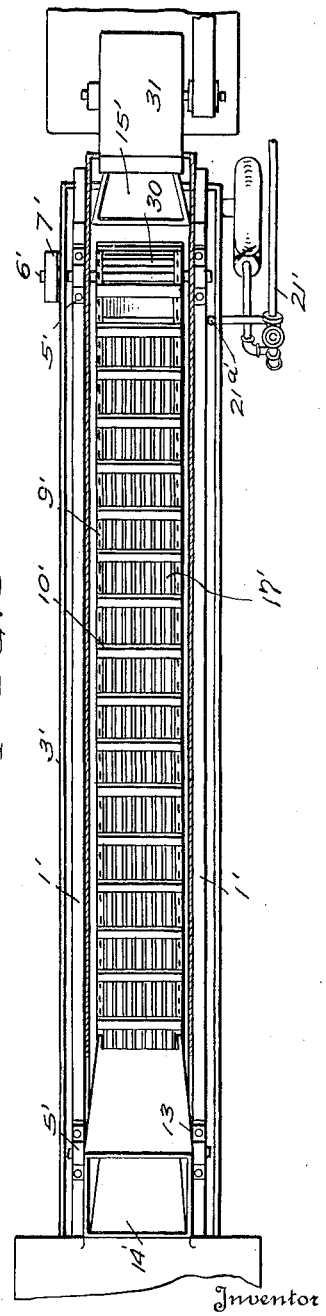
Inventor
RUDOLPH JOHN STEPICH
By Charles H. Young.
Attorney Patented June 11, 1929.

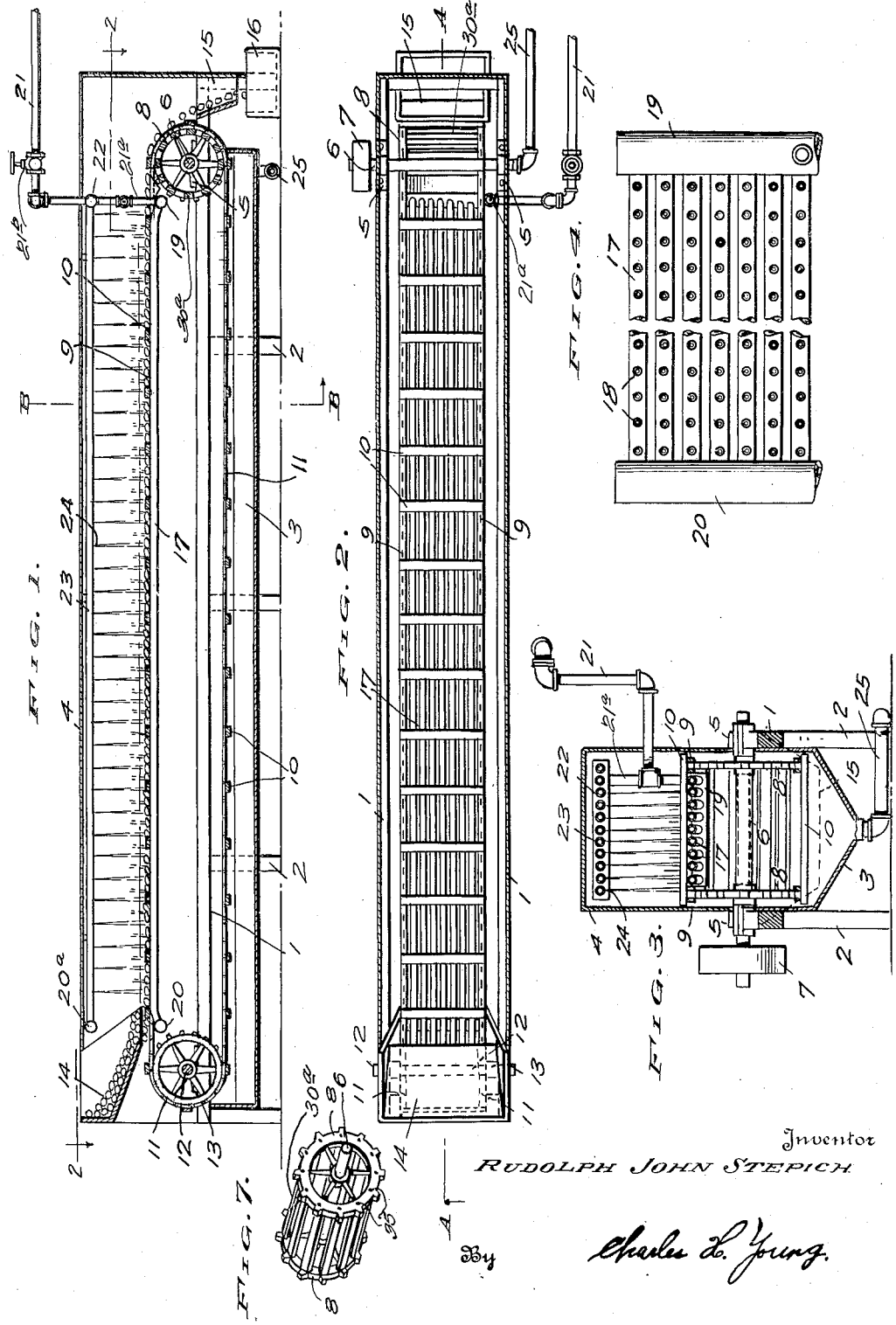

1,716,712

UNITED STATES PATENT OFFICE.

RUDOLPH JOHN STEPICH, OF STOCKTON, CALIFORNIA.

WASHING MACHINE FOR VEGETABLES, FRUIT, AND THE LIKE.

Application filed February 27, 1928. Serial No. 257,317.

My invention relates to improvements in apparatus for washing fruit, vegetables and the like,—and which is also available for killing and removing insects therefrom.

The invention has for its primary object to provide a machine of the class set forth which is simple of design; strong, durable and relatively inexpensive of manufacture; and which is capable of rapidly handling large quantities of the products mentioned in a thoroughly efficient manner.

Other objects and advantages of the invention reside in the novel combinations and arrangements of parts, modes of operation, etc., as will become more apparent as the description proceeds, reference being had to the accompanying drawings, which form a part of this specification, and in which,—

Figure 1 is a longitudinal vertical sectional view taken on the line A—A of Fig. 2; Fig. 2 is a horizontal sectional view of a machine incorporating my invention and taken on the line 2—2 of Figure 1; Fig. 3 is a cross section on the line B—B of Fig. 1; Fig. 4 is a plan view, partly broken and partly in section, showing the lower array of spray pipes;

Figure 5 is a longitudinal sectional view partly in elevation of a modified form of the invention;

Figure 6 is a sectional view of the device as shown in Figure 5, and taken on the line 6—6 thereof, and Figures 7 and 8 are perspective views of a slatted drum incorporated in each form of the invention.

Referring specifically to the drawings wherein the same reference characters designate the same parts in all views,—the machine comprises an elongated rectangular frame 1 suitably supported by legs 2. Between the legs 2 and secured thereto is a trough 3 sloping toward one end of the frame in a downward direction. An upstanding removable cover 4 of deep, inverted box-like form is supported upon the longitudinal side rails of the frame 1 and is designed to house the superstructure comprising the material spraying and conveying elements which will be presently described in detail.

At the discharge end of the machine, bearings 5 are suitably secured to the side members of the frame 1 for carrying a transverse drive shaft 6 upon one end of which is a drive pulley 7. Inwardly of the side members of frame 1, shaft 7 has keyed thereon a pair of sprocket gears 8,—one at either side of the frame. The chains 9 which are trained over sprocket gears 8 are connected by transverse slats 10 to thereby provide a conveyor for pulling the material along a longitudinal array of spray pipes as will be presently described,—it being noted from Fig. 1 that chains 9 are also trained around sprocket gears 11 at the opposite end of the frame 1. These latter sprocket gears 11 are keyed on a transverse shaft 12 carried in bearings 13 mounted on the side members of frame 1 at the inlet end of the machine which is provided with a hopper 14. Bearings 13 are in the nature of "take-up" boxes,—which is to say they are adjustable in the direction of the length of the frame 1,—so that the conveyor 9, 10 can be tightened or loosened as required.

The hopper 14 discharges the material upon the top flight of the conveyor,—or rather upon the array of longitudinal pipes 17 which supports the top flight of the conveyor 9, 10. In its passage along the array of pipes 17 toward the discharge hopper 15, the material is subjected to the action of vertical jets of fluid emanating from upper jet holes 18 of said pipes, and also to the downward spray of fluid from a superposed array of similar pipes 23 having downwardly discharging jet holes 24. The material which is carried along by slats 10 of conveyor 9, 10 is finally discharged into hopper 15 and thence into box 16. The material is thus thoroughly cleaned and is ready for shipment.

The longitudinal array of conveyor-supporting spray pipes 17 are supported by communicating, transversely disposed header pipes 19, 20,—while the upper longitudinal pipes 23 are supported by communicating header pipes 22, 20ª at either end.

The header pipes 19, 20 and 22, 20ª are suitably supported by the frame 1. Header pipes 19, 22 have a fluid conduit connection as indicated in Fig. 3 at 21ª, and through which connection fluid is supplied from a communicating conduit 21 controlled by a valve or gate 21ᵇ.

It is thus seen that as the fruit is carried along by the conveyor slats 10 it is thoroughly washed by the high pressure water or other fluid jets issuing from holes 18, 24,—the refuse and dirty water being collected in pan 3 and discharged through the pipe 25 at the lower end thereof.

In the form of the invention illustrated in Figs. 5 and 6 the structure of Figs. 1–4 has been modified in a number of particulars.

In the first place the pan 3' is set higher in frame 1' and is deeper than the pan 3 of Fig. 1. Here, idle shaft 12' extends through packing glands (not shown) in the sides of pan or tank 3',—the idle shaft 12' and its sprocket gears 11' being submerged in the fluid along with the material-receiving end of conveyor 9', 10' and the lower array of longitudinal pipes 17' supporting the same. Conveyor 9', 10' is upwardly slanted or elevated in the direction of the discharge hopper 15' at the opposite end of frame 1',—pipes 17' being correspondingly elevated as shown, with the upper array of pipes 23' disposed in spaced parallelism as before. The upper end of conveyor 9', 10' has its side chains 9' trained over sprockets 8' on the driven shaft 6' which is transversely journalled in frame 1'.

The arrays of longitudinal pipes 17', 23' have opposed series of jet holes 18', 24'. Headers 20', 20a' connect the respective pipes of series 17', 23' at their lower ends,—while headers 19', 22' serve the same function at the opposite ends thereof. These latter headers,—that is to say,—19', 22' are connected by a communicating pipe 21a' which has a fluid connection with a pressure fluid pipe 21'.

From the foregoing description,—read in connection with the accompanying drawings,—it will be apparent that the material passing from inlet hopper 14' is given an initial bath in the fluid in tank 3' to loosen the dirt thereon,—and this in addition to being subjected to the fluid jets from spray pipes 17', 23' while submerged and subsequently while being drawn toward discharge hopper 15'. The sets of spray pipes 17', 23' are suitably carried by the frame 1', and it is to be noted that the rear or upper ends thereof terminate short of the discharge hopper 15', the rear end of the top flight of the conveyor 9', 10' running over a slotted drum-like frame 30 connected to sprockets 8' and adjacent the discharge hopper 15'. Thus the material is not subjected to a spray in the final stage of its passage to discharge hopper 15'. A similar slatted drum-like frame 30a is shown in connection with the device of Figure 1. The drums 30, 30a may be bolted or otherwise secured to the pairs of sprockets 8, and 8', respectively, as at 35 and 35a, Figures 7 and 8.

Mounted between the sides of the frame 1 at the discharge end and above the conveyor 9', 10' is a blower 31 of any preferred design and driven by suitable means. The blast of air from the blower is directed down toward the drum 30 so that the material when it reaches the same is dried and freed of surplus moisture by the time it reaches the discharge hopper 15'. Manifestly, the water or other fluid tends to run back into tank 3' and drops through the spaces between the pipes 17'.

The cover 4 need not be integral with the box-like enclosure for the spray pipes and may merely rest upon the top thereof.

The inlet and outlet pipes 21, 25 and 21', 25', respectively may be connected to define fluid circuits and have a circulating pump (not shown) therein. This would come into play particularly when disinfecting solutions are used and it is desired to use same over and over again.

Having thus described my invention, what I claim as new and desire to secure by Letters Patent is:

1. A device of the class described comprising a frame, a longitudinally extending array of pipes carried by said frame and having upwardly extending jet openings, said pipes being closed at one end and having pressure fluid supply means at the other end, an endless conveyor having its top flight supported upon said array of spray pipes and including spaced transverse cleats whereby to move the work along in contact with the pipes, and means for driving said conveyor to carry material longitudinally of said pipes and in contact therewith.

2. A device of the class described comprising a frame, pressure fluid carrying pipes closely spaced and carried by said frame, said pipes having upwardly directed jet openings and being disposed to support the work, and means movable in the direction of one end of the frame for carrying the work along in contact with said pipes.

3. A device of the class described comprising a frame, a longitudinally extending array of pipes carried by said frame and having upwardly extending jet openings, said pipes being closed at one end, an endless conveyor having its top flight supported upon said array of spray pipes and including transverse cleats, means for driving said conveyor to carry material longitudinally of said pipes in contact therewith and supported thereby, a reservoir below said spray pipes and having an outlet pipe, an inlet pipe for said spray pipes, and a fluid circulating pump connecting said inlet and outlet pipes.

4. In a fruit washing machine or the like, the combination of a relatively long open-work conveyor, a series of spray pipes below the active flight of said conveyor and supporting the same against sagging, and the spray openings of said pipes being directed toward said conveyor whereby to treat the fruit as it is carried along the pipes.

In testimony whereof I affix my signature.

RUDOLPH JOHN STEPICH.